(12) United States Patent  (10) Patent No.: US 7,970,431 B2
Chen et al. (45) Date of Patent: Jun. 28, 2011

(54) REMOVABLE TRACKBALL FOR A HANDHELD WIRELESS COMMUNICATION DEVICE

(75) Inventors: Chao Chen, Waterloo (CA); Jana Lynn Papke, Milton (CA)

(73) Assignee: Research In Motion Limited, Waterloo, Ontario (CA)

( * ) Notice: Subject to any disclaimer, the term of this patent is extended or adjusted under 35 U.S.C. 154(b) by 648 days.

(21) Appl. No.: 11/685,702

(22) Filed: Mar. 13, 2007

(65) Prior Publication Data
US 2007/0259698 A1 Nov. 8, 2007

Related U.S. Application Data

(60) Provisional application No. 60/767,231, filed on Mar. 13, 2006.

(51) Int. Cl.
*H04M 1/00* (2006.01)
(52) U.S. Cl. .............. 455/550.1; 455/90.3; 455/575.1; 345/163; 345/167
(58) Field of Classification Search .......... 455/90.3, 455/550.1, 418, 560, 566, 575.1; 345/156–169
See application file for complete search history.

(56) References Cited

U.S. PATENT DOCUMENTS

| 5,889,507 | A  | * | 3/1999 | Engle et al. | 345/161 |
| 5,914,702 | A  | * | 6/1999 | Derocher et al. | 345/157 |
| 6,810,271 | B1 | * | 10/2004 | Wood et al. | 455/566 |
| 7,193,613 | B2 | * | 3/2007 | Jam | 345/168 |
| 7,456,759 | B2 | * | 11/2008 | Griffin et al. | 341/22 |
| 7,505,798 | B2 | * | 3/2009 | Hofer et al. | 455/575.1 |
| 2003/0094354 | A1 | * | 5/2003 | Badarneh | 200/18 |
| 2005/0053225 | A1 | * | 3/2005 | Griffin | 379/368 |
| 2007/0259697 | A1 | * | 11/2007 | Griffin et al. | 455/566 |

FOREIGN PATENT DOCUMENTS
EP 571068 A1 11/1993

OTHER PUBLICATIONS
CA Office Action—2,581,514 Mailed May 2, 2008.

* cited by examiner

*Primary Examiner* — Sujatha Sharma
(74) *Attorney, Agent, or Firm* — Novak Druce + Quigg LLP

(57) ABSTRACT

A handheld wireless communication device cradleable by an user during text entry. A display and key field are located on a front face of the device. The key field includes alphanumeric input keys and menu control keys. Additionally, an user-removable trackball navigation tool is provided on the device. The trackball navigation tool can be releasably snap-engaged or releasably friction-engaged in the body of the device. The removable trackball navigation tool enables the user to independently remove the trackball navigation tool from the device and perform self-maintenance on the device with respect to the navigation tool.

21 Claims, 9 Drawing Sheets

| 1 | 2 | 3 | 4 | 5 | 6 | 7 | 8 | 9 | 0 |
|---|---|---|---|---|---|---|---|---|---|
| Q | W | E | R | T | Y | U | I | O | P |
| A | S | D | F | G | H | J | K | L | |
| Z | X | C | V | B | N | M | | | |

*FIG. 5a*

| 1 | 2 | 3 | 4 | 5 | 6 | 7 | 8 | 9 | 0 |
|---|---|---|---|---|---|---|---|---|---|
| Q | W | E | R | T | Z | U | I | O | P |
| A | S | D | F | G | H | J | K | L | |
| Y | X | C | V | B | N | M | | | |

*FIG. 5b*

| 1 | 2 | 3 | 4 | 5 | 6 | 7 | 8 | 9 | 0 |
|---|---|---|---|---|---|---|---|---|---|
| A | Z | E | R | T | Y | U | I | O | P |
| Q | S | D | F | G | H | J | K | L | |
| W | X | C | V | B | N | M | | | |

*FIG. 5c*

| 1 | 2 | 3 | 4 | 5 | 6 | 7 | 8 | 9 | 0 |
|---|---|---|---|---|---|---|---|---|---|
| | | | P | Y | F | G | C | R | L |
| A | O | E | U | I | D | H | T | N | S |
| | Q | J | K | X | B | M | W | V | Z |

*FIG. 5d*

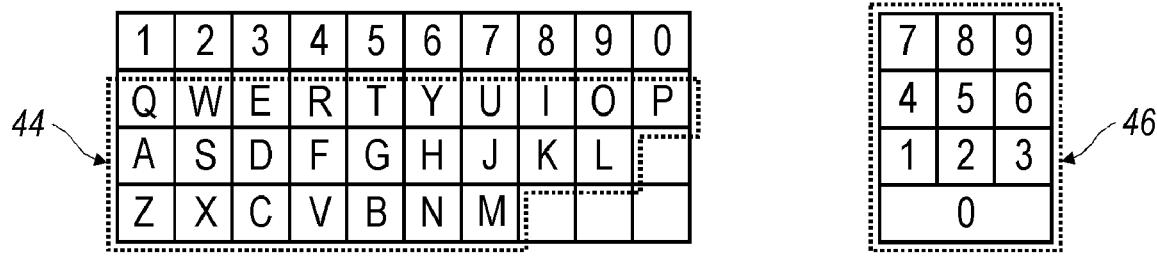
FIG. 6
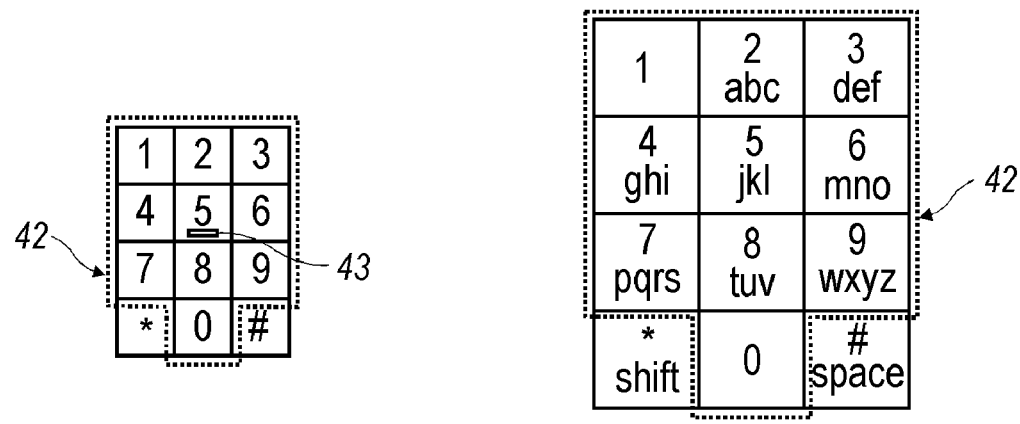
FIG. 7  FIG. 8

REMOVABLE TRACKBALL FOR A HANDHELD WIRELESS COMMUNICATION DEVICE

CROSS REFERENCE TO RELATED APPLICATIONS

The present application is a non-provisional of and claims the benefit of U.S. Provisional Application No. 60/767,231, filed Mar. 13, 2006. Said application is hereby expressly incorporated herein by reference in its entirety.

FIELD

The present disclosure, in a broad sense, is directed toward handheld electronic devices. More specifically, the disclosure is directed toward handheld communication devices that have wireless communication capabilities and the networks within which the wireless communication devices operate. The present disclosure further relates to the mounting of the trackball assembly on the handheld communication device.

BACKGROUND

With the advent of more robust wireless communications systems, compatible handheld communication devices are becoming more prevalent, as well as advanced. Where in the past such handheld communication devices typically accommodated either voice transmission (cell phones) or text transmission (pagers and PDAs), today's consumer often demands a combination device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Keyboards are used on many handheld devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize all of the keyboard surface as efficiently as possible.

Many keyboards on mobile devices have an input device for navigation through the graphical user interface. These interfaces include such devices as trackballs and rotating wheels which can be used to affect movement of a cursor or pointer, or to scroll up, down and about a displayed page. These navigation devices often occupy a relatively large amount of space on the incorporating mobile device. Because the navigation device is frequently used and often requires fine control, a lower end size limitation will normally be observed by device designers. To accommodate such larger, more convenient navigation devices on the housing of the mobile device, the amount of space that is available for the keys of the keyboard is correspondingly reduced if the keyboard and navigational device are proximately located to one another.

Frequent use of an input device such as a trackball may make the trackball and its corresponding trackball assembly susceptible to random debris or particulate contamination. Such contamination can interfere with the rotation motion or navigation of the input device. Additionally, trackball input devices on handheld electronic devices may occasionally experience functional failures where the trackball and/or trackball assembly may require repair or replacement. For example, failures due to possible defects in manufacturing, failures caused by mechanical shock from being dropped by the user, any other improper misuse of the handheld electronic device or the like could prevent the trackball assembly from functioning properly. Thus, a handheld electronic device that facilitates the removal of the trackball assembly is desired.

BRIEF DESCRIPTION OF THE DRAWINGS

Exemplary methods and arrangements conducted and configured according to the advantageous solutions presented herein are depicted in the accompanying drawings wherein:

FIG. 5a illustrates an exemplary QWERTY keyboard layout;

FIG. 5b illustrates an exemplary QWERTZ keyboard layout;

FIG. 5c illustrates an exemplary AZERTY keyboard layout;

FIG. 5d illustrates an exemplary Dvorak keyboard layout;

FIG. 6 illustrates a QWERTY keyboard layout paired with a traditional ten-key keyboard;

FIG. 7 illustrates ten digits comprising the numerals 0-9 arranged in a traditional, ITU Standard E.161 numeric telephone keypad layout, including the * and # flanking the zero;

FIG. 8 illustrates a traditional or standard phone key arrangement or layout according to the ITU Standard E.161 including both numerals and letters;

DETAILED DESCRIPTION

Figure 1:
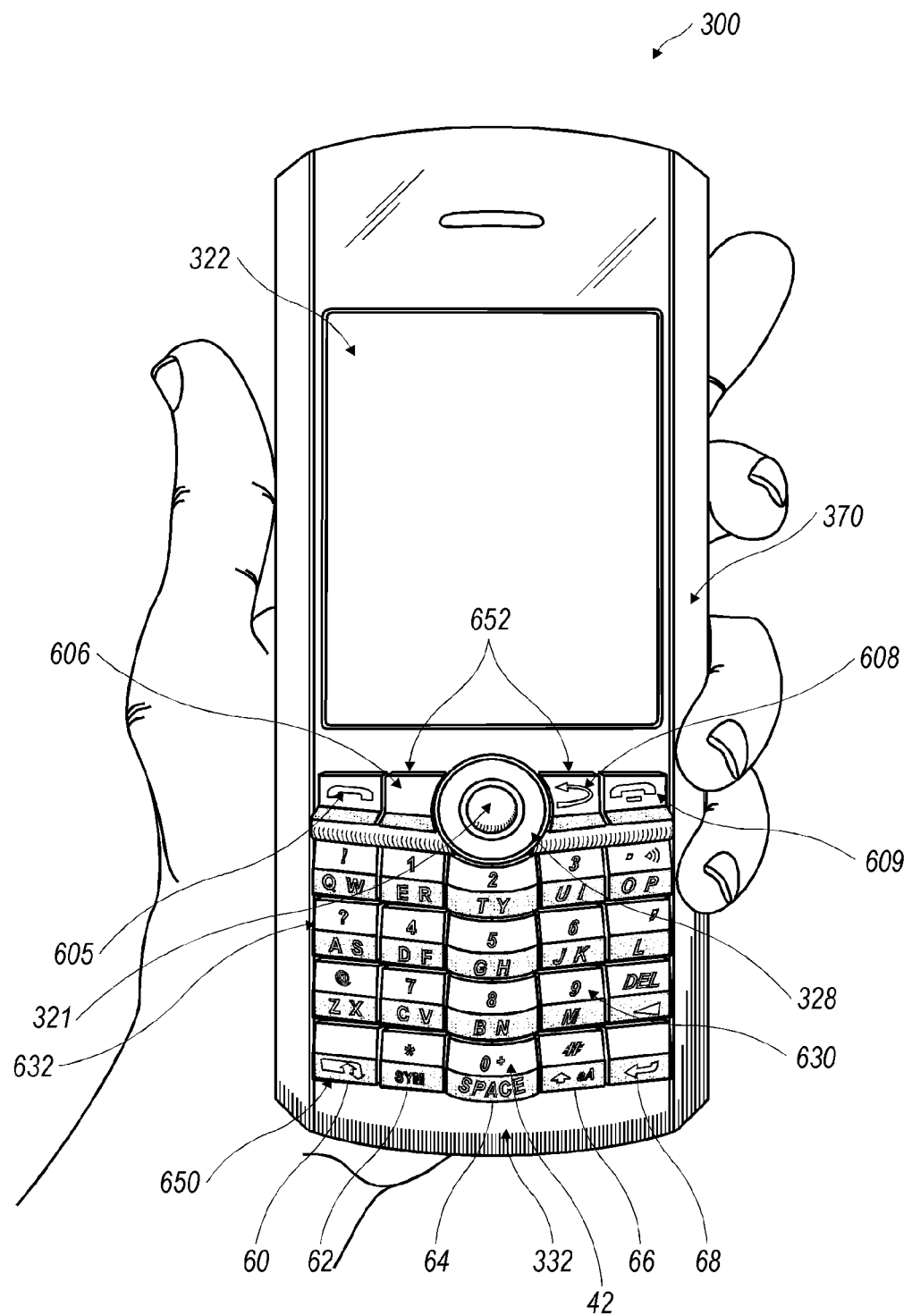
FIG. 1 depicts a handheld communication device configured according to the present teachings cradled in the palm of a user's hand.
Figure 2:
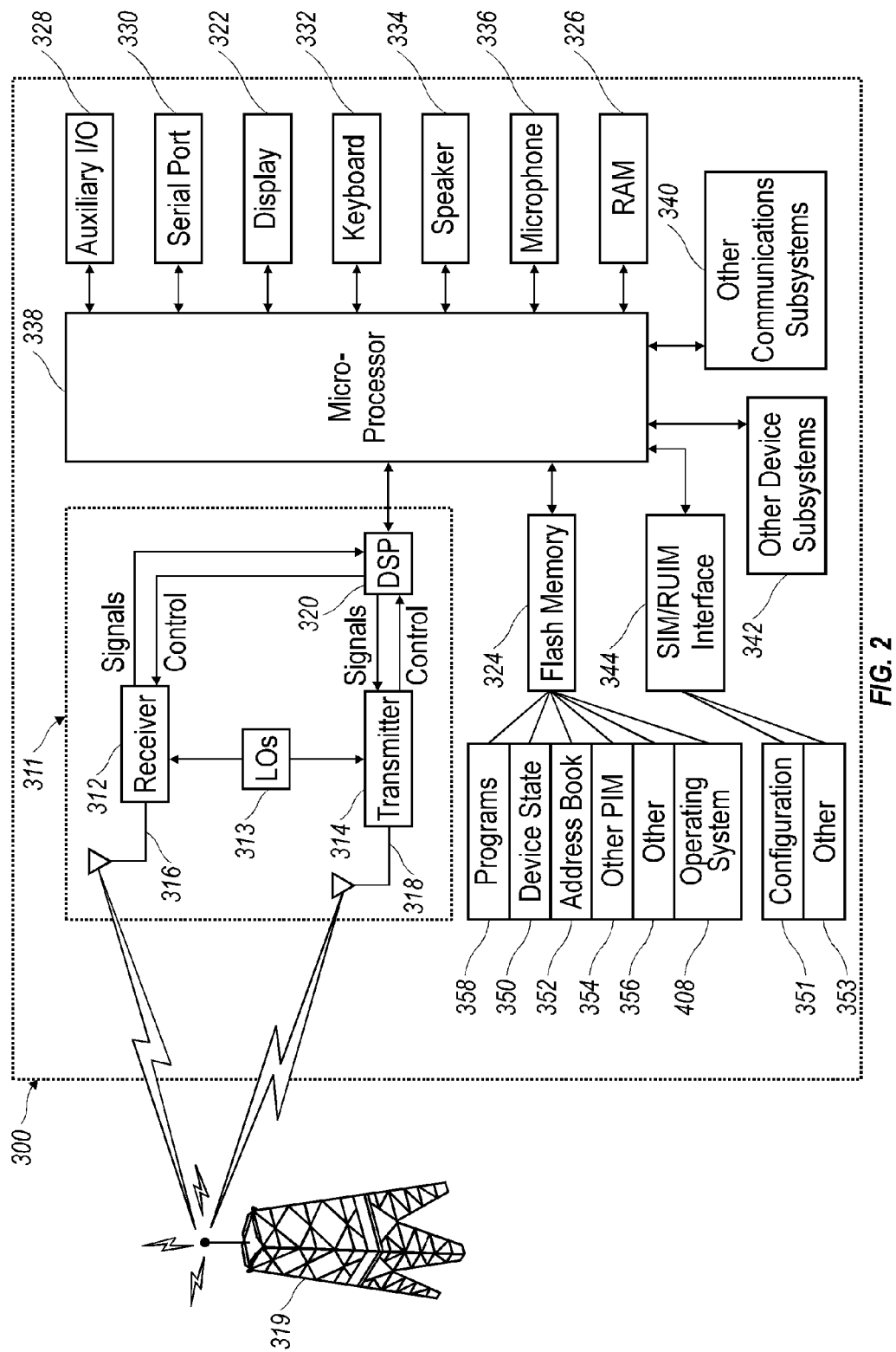
FIG. 2 is a block diagram representing a wireless handheld communication device interacting in a communication network.

An exemplary handheld electronic device 300 such as is shown in FIG. 1 and the device's cooperation in a wireless network 319 is exemplified in the block diagram of FIG. 2. These figures are exemplary only, and those persons skilled in the art will appreciate the additional elements and modifications necessary to make the device 300 work in particular network environments.

The block diagram of FIG. 2 denotes the device's 300 inclusion of a microprocessor 338 that controls the operation of the device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or an infrared device and associated circuits and components. Additionally, the microprocessor 338 is able to perform operating system 408 functions and preferably enables execution of software applications on the communication device 300.

The included auxiliary I/O subsystem 328 can take the form of a variety of different navigation tools including a trackball 321 based device, a thumbwheel, a navigation pad, or a joystick, just as examples. These navigation tools are preferably located on the front surface of the device 300 but may be located on any exterior surface of the device 300. Other auxiliary I/O devices can include external display devices and externally connected keyboards (not shown). While the above examples have been provided in relation to the auxiliary I/O subsystem 328, other subsystems capable of providing input or receiving output from the handheld electronic device 300 are considered within the scope of this disclosure. Additionally, other keys may be placed along the side of the device 300 to function as escape keys, volume control keys, scrolling keys, power switches, or user programmable keys, and may likewise be programmed accordingly.

As may be appreciated from FIG. 1, the handheld communication device 300 comprises a lighted display 322 located above a keyboard 332 suitable for accommodating textual input to the handheld communication device 300 when in an operable configuration. The front face of the device has a keyfield 650 that includes menu keys 652, alphanumeric keys 630, alphabetic keys 632, numeric keys 42, and other function keys as shown in FIG. 1. As shown, the device 300 is of unibody construction, also known as a "candy-bar" design.

Keys, typically of a push-button or push-pad nature, perform well as data entry devices but present problems to the user when they must also be used to affect navigational control over a screen-cursor. In order to solve this problem the present handheld electronic device 300 preferably includes an auxiliary input 328 that acts as a cursor navigational tool and which is also exteriorly located upon the front face of the device 300. Its front face location is particularly advantageous because it makes the tool easily thumb-actuable like the keys of the keyboard. A particularly usable embodiment provides the navigational tool in the form of a trackball 321 which is easily utilized to instruct two-dimensional screen cursor movement in substantially any direction, as well as act as an actuator when the ball 321 is depressed like a button. The placement of the trackball 321 is preferably above the keyboard 332 and below the display screen 322; here, it avoids interference during keyboarding and does not block the user's view of the display screen 322 during use.

Figure 3:
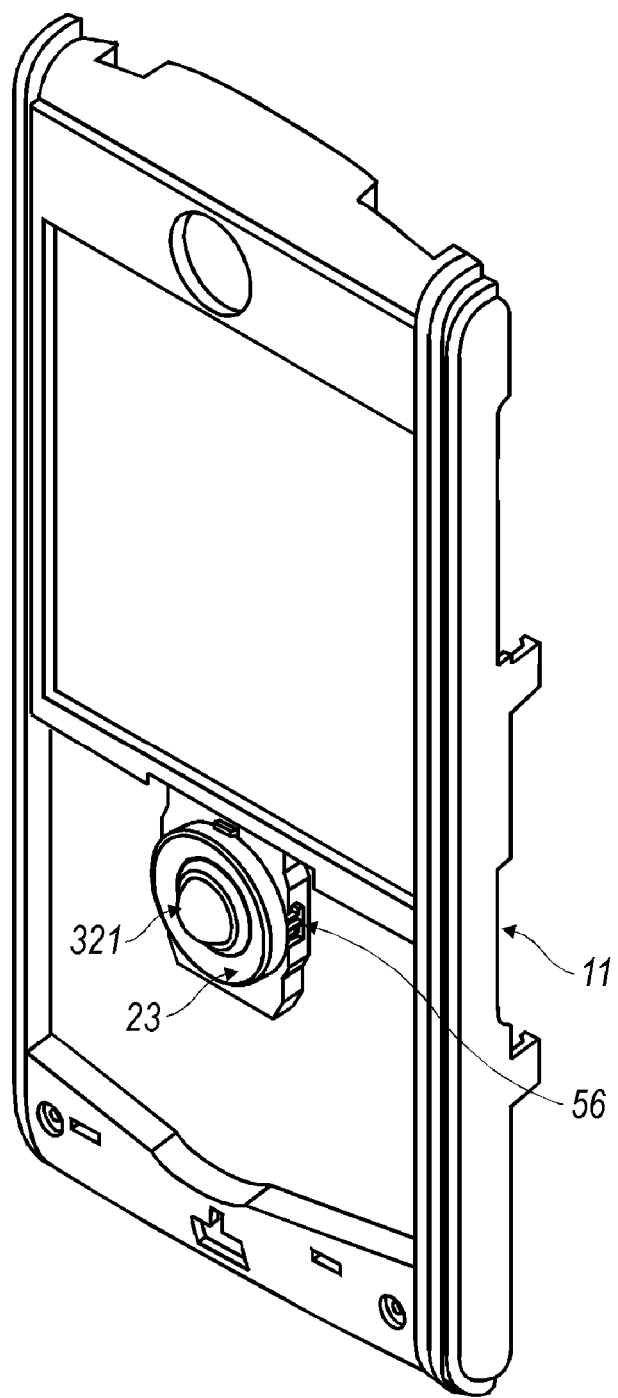
FIG. 3 is a detail view of the support frame with the trackball assembly mounted thereon.

FIG. 3 depicts incorporation of a trackball navigation tool or assembly 328, trackball 321, and outer locking ring 23 in a support frame 11 of a handheld mobile communication device 300.

Figure 4:
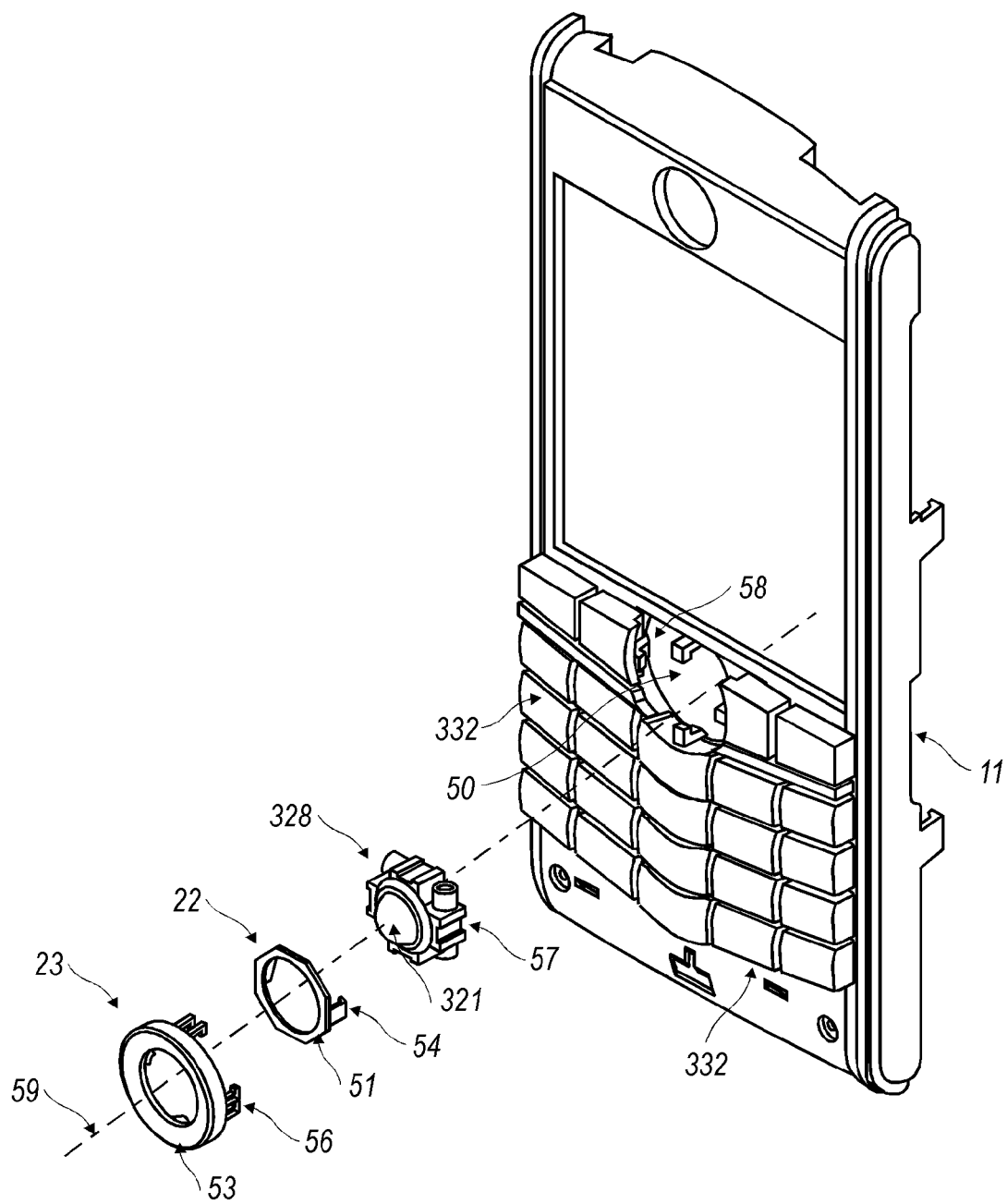
FIG. 4 is an exploded view of the retaining clips, trackball assembly and support frame.

As shown in FIG. 4, a removable trackball assembly 328 provides several characteristics which lend themselves to easier and more effective servicing or replacement on a support frame 11 of a handheld electronic device 300. The trackball 321 is supported by the trackball assembly 328 and rotates freely. Its spherical shape allows the trackball 321 to rotate in any desired direction. The trackball assembly 328 includes a sensor assembly that detects the motion of the ball 321 and is explained in detail below. The trackball assembly 328 is locked into position within a cavity well 50 in the handheld mobile communication device 300. The cavity 50 is positioned between the display screen 322 and the device keypad 332, and is substantially cylindrical in shape. Other cavity orientations can also be utilized. The cavity 50 includes a plurality of retention clips 58 that in conjunction with an inner locking ring 22 and an outer locking ring 23 are used to affix the trackball assembly 328 to the device 300 in a secure fashion. The locking rings are color coded with respect to each other in order to encourage proper placement and orientation with respect to the trackball 321 and the assembly 328.

In other embodiments, the inner locking ring 22 can be described as a ball retaining clip. This ball retaining clip comprises a ball retaining ring 51 and a plurality of fixing feet 54 extending from the ball retaining ring 51. Each of the plurality of fixing feet extends in a direction parallel to the longitudinal axis of the trackball assembly 328. The longitudinal axis as described herein refers to the assembly line 59 shown in FIG. 4. Likewise, the outer locking ring 23 can be described as trackball assembly retaining clip for releasably retaining the trackball assembly 328 in the cavity 50. The trackball assembly clip comprises a trackball assembly retaining ring 53 and a plurality of snap-engaging feet 56 extending from the trackball assembly retaining ring 53. Furthermore, each of the plurality of snap-engaging feet extends in a direction parallel to the longitudinal axis of the trackball navigation tool 328.

The trackball assembly 328 is held in place by the outer locking ring 23 and a plurality of retention clips 58 contained within the cavity well 50. Retention clips 58 are made from generally lightweight material that is substantially rigid, but flexible enough to permit the required snap-actions. The inner locking ring 22 holds the trackball 321 in place, but allows rotation of the ball 321. The lock ring 22 also permits the trackball 321 to be removed from the incorporating device 300 for replacement or servicing. Furthermore, the trackball 321 rotates about a plurality of axes that includes a first and second axis of rotation and which enables full freedom of rotation of the trackball 321.

Outer locking ring 23 further comprises a plurality of snap-engaging feet 56 extending laterally along the lower edge of the ring 23 relative to the cavity 50. The lower portion of the snap-engaging feet 56 releasably clip into retention clips 58 to secure the trackball assembly 328 in place.

The inner locking ring 22, in conjunction with the retaining clips and the cavity well 50, affixes the trackball assembly 328 to the frame 11 of the handheld device 300. Furthermore, the disassembly of the aforementioned components allows the removal of the assembly unit 328 for maintenance or replacement. The inner locking ring 22 restricts the assembly unit's coplanar movement with the cavity well 50. The inner locking ring 22 also comprises a plurality of fixing feet 54 extending laterally along with the lower edge of the inner locking ring 22 relative to the cavity 50. The lower portion of the inner locking ring 22 further comprises fixing feet 54 in order to secure it to the assembly 328. The retention clips 58 of the cavity well 50 engage the assembly unit 328 thereby affixing the unit 328 within the cavity well 50.

Additionally, the trackball assembly 328 has a plurality of lateral ports 57 extending around the outer wall of the assembly 328. These ports 57 are parallel to the cavity retention clips 58 and allow the clips 58 to be placed within the ports 57 in order to facilitate locking the assembly unit 328 into the cavity well 50. The top portion of the cavity retention clips 58 generally comprises substantially flattened edges. The flattened top portions of the retention clips 58 are slightly angled downward relative to the body of the handheld device 300 in order to provide additional retention force for the assembly unit 328 either through added friction or snap engagement with the lateral ports 57.

The arrangement is such that removal of the assembly 328 is allowed only when the clips 58 are removed from engaging the lateral ports 57 of the assembly 328. Furthermore, the snap-engaging feet 56 can be designed to releasably engage a lateral port 57 in the cavity 50 at the front face 370 of the body. Thus, removal of assembly 328 would further require disengaging these snap-engaging feet 56 from the lateral port 57.

To remove the assembly unit 328 from the cavity well 50, force is applied to the clips 58 so that the clips 58 no longer frictionally engage or snap engage the assembly housing. This applied force will also displace the clips 58 from their coupling in the ports 57 of the assembly unit 328. Once the engagement of the clips 58 is eliminated, the assembly can be removed by axially sliding the assembly 328 out of the cavity 50.

Referring again to FIG. 1, the handheld wireless communication device 300 is also configured to send and receive voice communications such as mobile telephone calls. At least one key of the key field 650 is positioned adjacent to the trackball navigation tool and that key has a circular arc-shaped edge conformance fitting to a circular arc-shaped boundary about the trackball navigation tool 328. To facilitate telephone calls, two call keys 605, 609 oppositely and laterally flank the trackball navigation tool. One of the two call keys is a call initiation key 605 and the other is a call termination key 609.

The key 606 positioned adjacent to the trackball navigation tool 328 is a menu key that upon actuation displays an available action menu on the display in dependence of the currently running application on the device 300.

The trackball navigation tool 321 enables methods and arrangements for facilitating diagonal cursor movement in such environments as icon arrays 70 and spreadsheet grids on a display screen 322 of a relatively small, wireless handheld communication device 300, variously configured as described above, such as that depicted in FIG. 9. One exemplary embodiment takes the form of a method for affecting movement of a cursor 71 on the display screen 322 of a handheld communication device 300. The method includes sensing movement at an auxiliary user input 328 of the handheld communication device 300 indicative of the user's desire to affect diagonal movement of the cursor 71 on the display screen 322 of the handheld communication device 300. X-direction signals and y-direction signals are produced based on the sensed movement at the auxiliary user input 328. During that time while the necessary signals are being collected and processed, the cursor 71 is held steady on the display screen 322 until a predetermined criterion is met for discriminating whether the user has indicated x-direction cursor movement, y-direction cursor movement or diagonal cursor movement. In that the processing is typically conducted by a processor 338 according to a resident computer program, the predetermined criterion is either a preset condition or a user definable condition.

The apparatus of a handheld communication device 300 is disclosed that is capable of affecting diagonal movement of a highlighting cursor 71 amongst an array of icons 70 on a display screen 322 of the handheld communication device 300. The display screen 322 is located above a keyboard 332 suitable for accommodating textual input to the handheld communication device 300 and an auxiliary user input 328 is located essentially between the display 322 and keyboard 332. Sensors 72, 78 (74, 76) are provided that are capable of sensing movement at the auxiliary user input 328 indicative of the user's desire to affect diagonal movement of the highlighting cursor 71 from a currently highlighted icon number 73 on the display screen 322 to a diagonally located icon 75 on the display screen 322 of the handheld communication device 300. The sensors produce x-direction signals and y-direction signals based on the sensed movement at the auxiliary user input 328. A processor 338 is included that is capable of analyzing the produced x-direction signals and y-direction signals and outputting a cursor control signal that holds the highlighting cursor 71 steady on a presently highlighted icon 73 on the display screen 322 during the processing and until a predetermined criterion is met for discriminating whether the user has indicated movement to an icon left or right of the presently highlighted icon, above or below the presently highlighted icon 73, or diagonally positioned relative to the presently highlighted icon numeral 73 and then affecting diagonal movement of the highlighting cursor number 71 between diagonally positioned icons on the display screen of the handheld communication device 300 when diagonal cursor movement is discriminated to have been user indicated.

Furthermore, the device is equipped with components to enable operation of various programs, as shown in FIG. 2. In an exemplary embodiment, the flash memory 324 is enabled to provide a storage location for the operating system 408, device programs 358, and data. The operating system 408 is generally configured to manage other application programs 358 that are also stored in memory 324 and executable on the processor 338. The operating system 408 honors requests for services made by application programs 358 through predefined application program 358 interfaces. More specifically, the operating system 408 typically determines the order in which multiple applications 358 executed on the processor 338 and the execution time allotted for each application 358, manages the sharing of memory 324 among multiple applications 358, handles input and output to and from other device subsystems 342, and so on. In addition, users can typically interact directly with the operating system 408 through a user interface usually including the keyboard 332 and display screen 322. While the operating system 408 in a preferred embodiment is stored in flash memory 324, the operating system 408 in other embodiments is stored in read-only memory (ROM) or similar storage element (not shown). As those skilled in the art will appreciate, the operating system 408, device application 358 or parts thereof may be loaded in RAM 326 or other volatile memory.

In a preferred embodiment, the flash memory 324 contains programs/applications 358 for execution on the device 300 including an address book 352, a personal information manager (PIM) 354, and the device state 350. Furthermore, programs 358 and other information 356 including data can be segregated upon storage in the flash memory 324 of the device 300.

When the device 300 is enabled for two-way communication within the wireless communication network 319, it can send and receive signals from a mobile communication service. Examples of communication systems enabled for two-way communication include, but are not limited to, the GPRS (General Packet Radio Service) network, the UMTS (Universal Mobile Telecommunication Service) network, the EDGE (Enhanced Data for Global Evolution) network, and the CDMA (Code Division Multiple Access) network and those networks, generally described as packet-switched, narrowband, data-only technologies which are mainly used for short burst wireless data transfer. For the systems listed above, the communication device 300 must be properly enabled to transmit and receive signals from the communication network 319. Other systems may not require such identifying information. GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different communication devices 300. The communication device 300 may be able to operate some features without a SIM/RUIM card, but it will not be able to communicate with the network 319. A SIM/RUIM interface 344 located within the device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in a preferred embodiment is equipped with an integral or internal antenna 318 for transmitting signals to the communication network 319. Likewise the communication device 300 in the preferred embodiment is equipped with another antenna 316 for receiving communication from the communication network 319. These antennae (316, 318) in another preferred embodiment are combined into a single antenna (not shown). As one skilled in the art would appreciate, the antenna or antennae (316, 318) in another embodiment are externally mounted on the device 300.

When equipped for two-way communication, the communication device 300 features a communication subsystem 311. As is well known in the art, this communication subsystem 311 is modified so that it can support the operational needs of the device 300. The subsystem 311 includes a transmitter 314 and receiver 312 including the associated antenna or antennae (316, 318) as described above, local oscillators (LOs) 313, and a processing module 320 which in a preferred embodiment is a digital signal processor (DSP) 320.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

Figure 9:
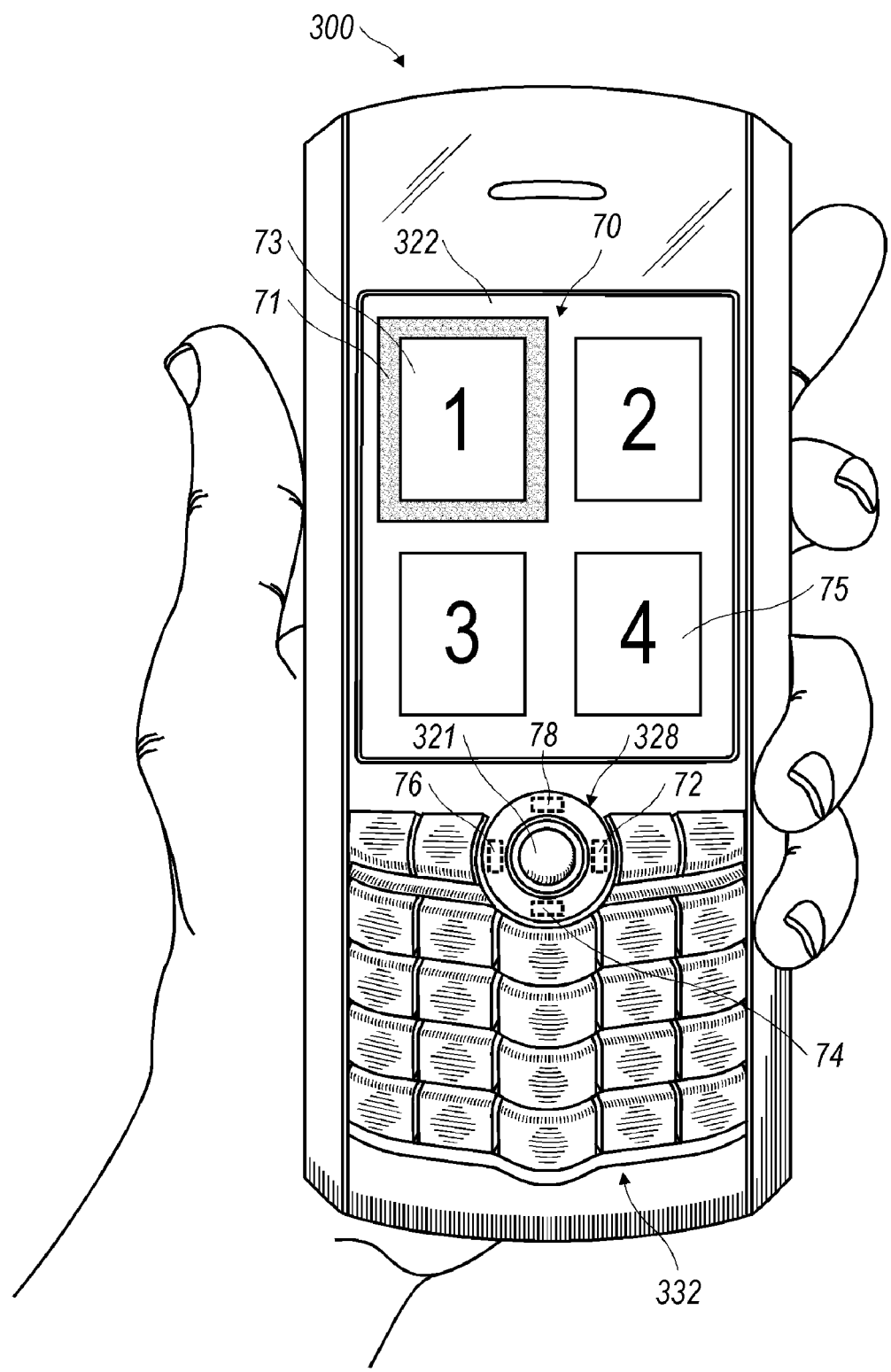
FIG. 9 is a perspective view of another exemplary handheld communication device cradled in a user's hand and displaying an array of four icons (1, 2, 3 and 4) on a display thereof.

The user is capable of interacting with the device 300 through reading information displayed on the display screen 322, entering text using the keyboard 332, and inputing cursor movement through the use of the auxiliary user input device 328, among other ways. The auxiliary user input device 328 as described above is preferably a trackball 321, as depicted in FIG. 9. Motion of the trackball 321 is assessed using a plurality of sensors 72, 74, 76, 78 that quantify rotational motion of the trackball 321 about an intersecting x-axis 82 and an intersecting y-axis 84 of the trackball (see FIG. 10).

In one embodiment, the plurality of sensors 72, 78 number two. One of the two sensors 72 outputs signals indicative of x-component rolling motion of the trackball 321 relative to the handheld communication device 300 and about the intersecting y-axis 84 of the trackball 321 (see the rotational arrows about the y-axis in FIG. 10). The other of the two sensors 78 outputs signals indicative of y-component rolling motion of the trackball 321 relative to the handheld communication device 300 and about the intersecting x-axis 82 of the trackball 321 (see the rotational arrows about the x-axis in FIG. 10). In this configuration, the two sensors 72, 78 are oriented radially about the trackball 321 with approximately ninety degree spacing therebetween. In one embodiment, each of the sensors is a hall effect sensor located proximate the trackball.

Figure 10:
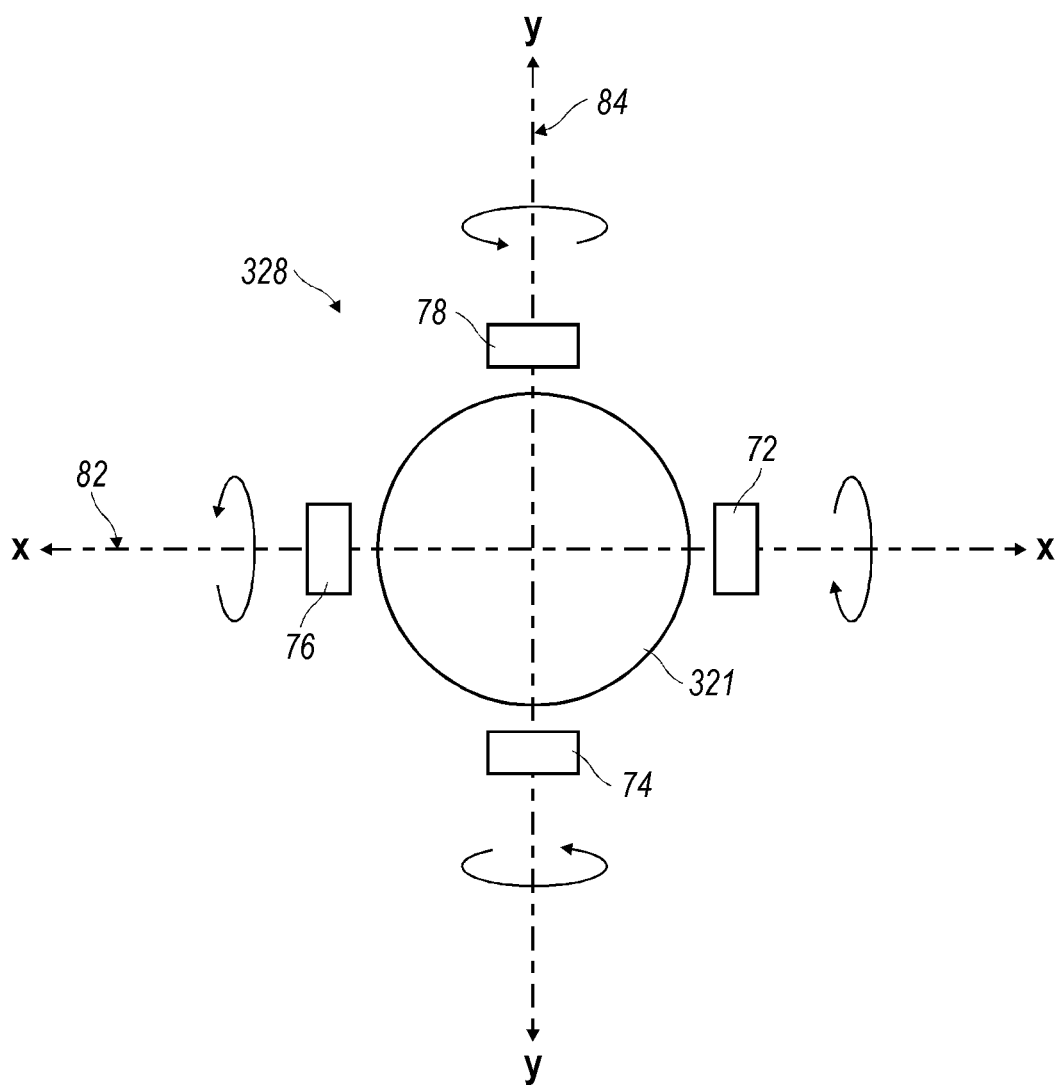
FIG. 10 is a schematic representation of an auxiliary user input in the form of a trackball.

In another embodiment, the plurality of sensors 72, 74, 76, 78 number four. A first pair of opposed sensors 72, 76 outputs signals indicative of x-component rolling motion of the trackball 321 relative to the handheld communication device 300 and about the intersecting y-axis 84. A second pair of opposed sensors 74, 78 outputs signals indicative of a y-component rolling motion of the trackball 321 relative to the handheld communication device 300 and about the intersecting x-axis 82. The four sensors 72, 74, 76, 78 are oriented radially about the trackball 321 with approximately ninety degree spacing between consecutive sensors as depicted in FIGS. 9 and 10.

Each produced x-direction signal represents a discrete amount of x-component (incremental x-direction) rolling motion of the trackball 321 relative to the handheld communication device 300 while each produced y-direction signal represents a discrete amount of y-component (incremental y-direction) rolling motion of the trackball 321 relative to the handheld communication device 300.

Figure 11:
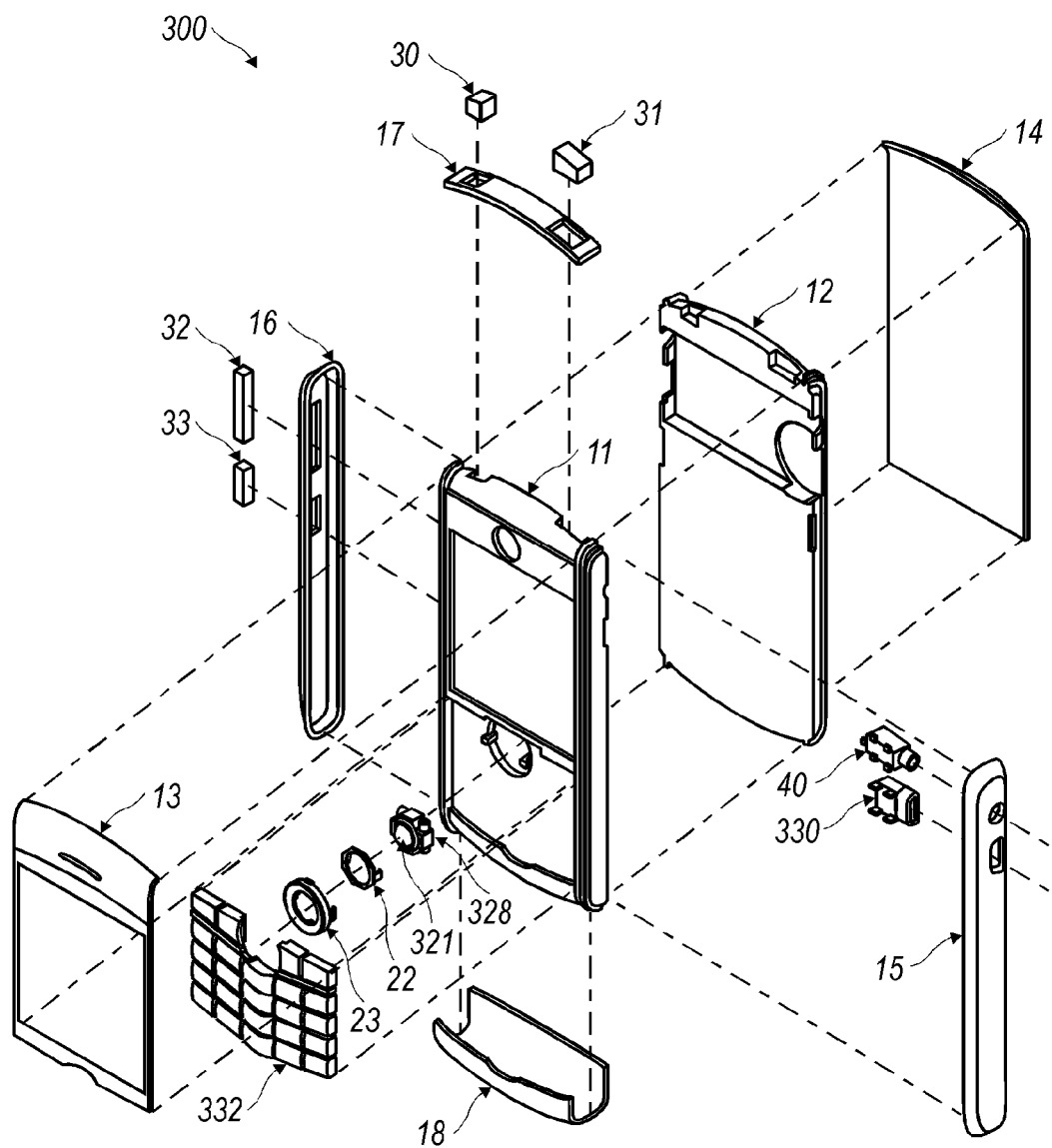
FIG. 11 is an exploded perspective view of an exemplary wireless handheld electronic device incorporating a trackball assembly as the auxiliary user input.

The integration of the trackball assembly into handheld device 300 can be seen in the exploded view of FIG. 11 showing some of the typical components found in the assembly of the handheld electronic device 300. The construction of the device benefits from various manufacturing simplifications. The internal components are constructed on a single PCB (printed circuit board) 12. The keyboard 332 is constructed from a single piece of material, and in a preferred embodiment is made from plastic. The keyboard 332 sits over dome switches (not shown) located on the PCB 12 in a preferred embodiment. One switch is provided for every key on the keyboard in the preferred embodiment, but in other embodiments more than one switch or less than one switch per key are possible configurations. The support frame 11 holds the keyboard 332 and navigation tool 328 in place above the PCB 12. The support frame 11 also provides an attachment point for the display (not shown). A lens 13 covers the display to prevent damage. When assembled, the support frame 11 and the PCB 12 are fixably attached to each other and the display is positioned between the PCB 12 and support frame 11.

The navigation tool 328 is frictionally engaged with the support frame 11, but in a preferred embodiment the navigation tool 328 is removable when the device is assembled. This allows for replacement of the navigation tool 328 if/when it becomes damaged or the user desires replacement with a different type of navigation tool 328. In the exemplary embodiment of FIG. 11, the navigation tool 328 is a ball 321 based device. Other navigation tools 328 such as joysticks, four-way cursors, or touch pads are also considered to be within the scope of this disclosure. When the navigation tool 328 has a ball 321, the ball 321 itself can be removed without removal of the navigation tool 328. The removal of the ball 321 is enabled through the use of an outer removable ring 23 and an inner removable ring 22. These rings 22, 23 ensure that the navigation tool 328 and the ball 321 are properly held in place against the support frame 11.

A serial port (preferably a Universal Serial Bus port) 330 and an earphone jack 40 are fixably attached to the PCB 12 and further held in place by right side element 15. Buttons 30-33 are attached to switches (not shown), which are connected to the PCB 12.

Final assembly involves placing the top piece 17 and bottom piece 18 in contact with support frame 11. Furthermore, the assembly interconnects right side element 15 and left side element 16 with the support frame 11, PCB 12, and lens 13. These side elements 16, 15 provide additional protection and strength to the support structure of the device 300. In a preferred embodiment, backplate 14 is removably attached to the other elements of the device.

As intimated hereinabove, one of the more important aspects of the handheld electronic device 300 to which this disclosure is directed is its size. While some users will grasp the device 300 in both hands, it is intended that a predominance of users will cradle the device 300 in one hand in such a manner that input and control over the device 300 can be affected using the thumb of the same hand in which the device 300 is held, however it is appreciated that additional control can be effected by using both hands. As a handheld device 300 that is easy to grasp and desirably pocketable, the size of the device 300 must be kept relatively small. Of the device's dimensions, limiting its width is important for the purpose of assuring cradleability in a user's hand. Moreover, it is preferred that the width of the device 300 be maintained at less than ten centimeters (approximately four inches). Keeping the device 300 within these dimensional limits provides a hand cradleable unit that users prefer for its usability and portability. Limitations with respect to the height (length) of the device 300 are less stringent when considering hand-cradleability. Therefore, in order to gain greater size, the device 300 can be advantageously configured so that its height is greater than its width, but still remain easily supported and operated in one hand.

A potential problem is presented by the small size of the device 300 in that there is limited exterior surface area for the inclusion of user input and device output features. This is especially true for the "prime real estate" on the front face of the device 300, where it is most advantageous to include a display screen 322 that outputs information to the user. The display screen 322 is preferably located above a keyboard that is utilized for data entry into the device 300 by the user. If the screen 322 is provided below the keyboard 332, a problem occurs in that viewing the screen 322 is inhibited when the user is inputting data using the keyboard 332. Therefore it is preferred that the display screen 322 be above the input area, thereby solving the problem by assuring that the hands and fingers do not block the view of the screen 332 during data entry periods.

To facilitate textual data entry into the device 300, an alphabetic keyboard is provided. In one version, a full alphabetic keyboard 332 is utilized in which there is one key per letter. In this regard, the associated letters can be advantageously organized in QWERTY, QWERTZ, AZERTY or Dvorak layouts, among others, thereby capitalizing on certain users' familiarity with these special letter orders. In order to stay within the bounds of the limited front surface area, however, each of the keys must be commensurately small when, for example, twenty-six keys must be provided in the instance of the English language.

An alternative configuration is to provide a reduced keyboard in which at least some of the keys have more than one letter associated therewith (see FIG. 1 for an example). This means that fewer keys are required which makes it possible for those fewer keys to each be larger than in the instance when a full keyboard is provided on a similarly dimensioned device. Some users will prefer the solution of the larger keys over the smaller ones, but it is necessary that software or hardware solutions be provided in order to discriminate which of the several associated letters the user intends based on a particular key actuation, a problem the full keyboard avoids.

Preferably, the character discrimination is accomplished utilizing disambiguation software included on the device 300. To accommodate software use on the device 300, a memory 324 and microprocessor 338 are provided within the body of the handheld unit for receiving, storing, processing, and outputting data during use. Therefore, the problem of needing a textual data input means is solved by the provision of either a full or reduced alphabetic keyboard 332 on the presently disclosed handheld electronic device 300. It should be further appreciated that the keyboard 332 can be alternatively provided on a touch sensitive screen in either a reduced or full format.

Keys, typically of a push-button or touchpad nature, perform well as data entry devices but present problems to the user when they must also be used to affect navigational control over a screen-cursor. In order to solve this problem, the present handheld electronic device 300 preferably includes an auxiliary input that acts as a cursor navigational tool and which is also exteriorly located upon the front face of the device 300. Its front face location is particularly advantageous because it makes the tool easily thumb-actuable like the keys of the keyboard. In a particularly useful embodiment, the navigational tool is a trackball 321 which is easily utilized to instruct two-dimensional screen cursor movement in substantially any direction, as well as act as an actuator when the ball of the trackball 321 is depressed like a button. The placement of the trackball 321 is preferably above the keyboard 332 and below the display screen 322; here, it avoids interference during keyboarding and does not block the user's view of the display screen 322 during use (See FIG. 1).

In some configurations, the handheld electronic device 300 may be standalone in that it does not connect to the "outside world." As discussed before, one example would be a PDA that stores such things as calendars and contact information but is not capable of synchronizing or communicating with other devices. In most situations such isolation will be viewed detrimentally in that synchronization is a highly desired characteristic of handheld devices today. Moreover, the utility of the device 300 is significantly enhanced when connectable within a communication system, and particularly when connectable on a wireless basis in a network 319 in which voice, text messaging, and other data transfer are accommodated.

As shown in FIG. 1, the handheld electronic device 300 is cradleable in the palm of a user's hand. The handheld device 300 is provided with a keyboard 332 to enter text data and place telephone calls and a display screen 322 for communicating information to the user. A connect/send key 605 is preferably provided to aid in the placement of a phone call. Additionally, a disconnect/end key 609 is provided. The send key 605 and end key 609 preferably are arranged in a row of keys including a auxiliary input device 328. Additionally, the row of keys, including the navigation tool, preferably has a menu key 606 and a back key or escape key 608. The menu key 606 is used to bring up a menu and the escape key 608 is used to return to the previous screen or previous menu selection.

The handheld electronic device 300 includes an input portion 604 and an output display portion. The output display portion can be a display screen 322, such as an LCD or other similar display device.

The keyboard 332 includes a plurality of keys that can be of a physical nature such as actuable buttons or they can be of a software nature, typically constituted by virtual representations of physical keys on a display screen 322 (referred to herein as "software keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof Further, depending on the application 358 or feature in use, specific keys can be enabled or disabled.

In the case of physical keys, all or a portion of the plurality of keys have one or more indicia, representing character(s), command(s), and/or functions(s), displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the screen 322.

In the case of software keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and software keys can be combined in many different ways as appreciated by those skilled in the art. In one embodiment, physical and software keys are combined such that the plurality of enabled keys for a particular application or feature of the handheld electronic device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

The various characters, commands and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44*a* shown in FIG. 5*a*. The QWERTZ keyboard layout is normally used in German-speaking regions; this alphabetic key arrangement 44*b* is shown in FIG. 5*b*. The AZERTY keyboard layout 44*c* is normally used in French-speaking regions and is shown in FIG. 5*c*. The Dvorak keyboard layout was designed to allow typists to type faster; this alphabetic key arrangement 44*d* is shown in FIG. 5*d*.

Alphabetic key arrangements are often presented along with numeric key arrangements. Typically, the numbers 1-9 and 0 are positioned in the row above the alphabetic keys 44*a-d*, as shown in FIG. 5*a-d*. Alternatively, the numbers share keys with the alphabetic characters, such as the top row of the QWERTY keyboard. Yet another exemplary numeric key arrangement is shown in FIG. 6, where a "ten-key" style numeric keypad 46 is provided on a separate set of keys that is spaced from the alphabetic/numeric key arrangement 44. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 7.

As shown in FIG. 7, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld electronic devices 300 to include a combined text-entry keyboard and a telephony keyboard. Examples of such mobile communication devices 300 include mobile stations, cellular telephones, wireless personal digital assistants (PDAs), two-way paging devices, and others. Various keyboards are used with such devices and can be termed a full keyboard, a reduced keyboard, or phone key pad.

In embodiments of a handheld electronic device 300 having a full keyboard, the alphabetic characters are singly associated with the plurality of physical keys. Thus, in an English-language keyboard of this configuration, there are at least 26 keys in the plurality so that there is at least one key for each letter.

FIGS. 7 and 8 both feature numeric keys arranged according to the ITU Standard E.161 form. In addition, FIG. 8 also incorporates alphabetic characters according to the ITU Standard E. 161 layout as well.

As intimated above, in order to further reduce the size of a handheld electronic device 300 without making the physical keys or software keys too small, some handheld electronic devices 300 use a reduced keyboard, where more than one character/command/function is associated with each of at least a portion of the plurality of keys. This results in certain keys being ambiguous since more than one character is represented by or associated with the key, even though only one of those characters is typically intended by the user when activating the key.

Thus, certain software usually runs on the processor 338 of these types of handheld electronic devices 300 to determine or predict what letter or word has been intended by the user. Some examples of software include predictive text routines which typically include a disambiguation engine and/or predictive editor application. The software preferably also has the ability to recognize character letter sequences that are common to the particular language, such as, in the case of English, words ending in "ing." Such systems can also "learn" the typing style of the user making note of frequently used words to increase the predictive aspect of the software. Other types of predictive text computer programs may be utilized with the reduced keyboard arrangements described herein, without limitation. Some specific examples include the multi-tap method of character selection and "text on nine keys".

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

FIG. 1 shows a handheld electronic device 300 that carries an example of a reduced keyboard using the QWERTY keyboard layout on a physical keyboard array of twenty keys comprising five columns and four rows. Fourteen keys are used for alphabetic characters and ten keys are used for numbers. Nine of the ten numbers share a key with alphabetic characters. The "space" key and the number "0" share the same key, which is centered on the device and centered below the remainder of the numbers on the keyboard 332. While in other embodiments, the number "0" may be located on other keys. Many of the keys have different sizes than the other keys, and the rows are non-linear. In particular, the keys in the middle column 64 are wider than keys in the outer columns 60, 62, 66 and 68. To readily identify the phone user interface (the second user interface), the numeric phone keys 0-9 include a color scheme that is different from that of the remaining keys associated with the QWERTY key arrangement. As exemplified in FIG. 1, a color scheme of the numeric phone keys has a two tone appearance, with the upper portion of the numeric keys being a first color and the lower portion of the numeric keys being a second color. The first color may be lighter than the second color, or darker than the second color.

Another embodiment of a reduced alphabetic keyboard is found on a standard phone keypad 42. Most handheld electronic devices 300 having a phone key pad 42 also typically include alphabetic key arrangements overlaying or coinciding with the numeric keys as shown in FIG. 8. Such alphanumeric phone keypads are used in many, if not most, traditional handheld telephony mobile communication devices such as cellular handsets.

As described above, the International Telecommunications Union ("ITU") has established phone standards for the arrangement of alphanumeric keys. The standard phone numeric key arrangement shown in FIGS. 7 (no alphabetic letters) and 8 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI T1.703-1995/1999 and ISO/IEC 9995-8:1994. Regarding the numeric arrangement, it can be aptly described as a top-to-bottom ascending order three-by-three-over-zero pattern.

While several keyboard layouts have been described above, alternative layouts integrating the navigation tool into the keyboard are presented below. The key arrangements and mobile devices described herein are examples of a conveniently sized multidirectional navigational input key that is integrated with an alphanumeric key layout. The example multidirectional navigational input keys can be used in a navigation mode to move, for example, a cursor or a scroll bar. In an alphabetic or numeric mode, it can be used to enter numbers or letters. This dual feature allows for fewer and larger keys to be disposed on the keyboard while providing for a QWERTY, reduced QWERTY, QWERTZ, Dvorak, or AZERTY key layout and navigational input. These familiar keyboard layouts allow users to type more intuitively and quickly than, for example, on the standard alphabetic layout on a telephone pad. By utilizing fewer keys, the keys can be made larger and therefore more convenient to the user.

In some examples, keys in the middle columns are larger than keys in the outer columns to prevent finger overlap on the interior keys. As used herein, middle columns are all columns that are not on the outside left and right sides. The term "middle column" is not limited to the center column. It is easier for a user to press keys on the outer columns without their finger overlapping an adjacent key. This is because part of the user's thumb or finger can overlap the outside housing of the device, rather than other keys. Therefore, these outer column keys can be made smaller. The multidirectional navigational input device is provided in the center of the keypad and has a larger surface than the outside keys. The larger surface in the inner part of the keyboard helps prevent finger overlap.

Exemplary embodiments have been described hereinabove regarding both handheld electronic devices 300, as well as the communication networks 319 within which they cooperate. Again, it should be appreciated that the focus of the present disclosure is ability to remove the trackball and/or trackball assembly from an assembled handheld electronic device.

What is claimed is:

1. A handheld wireless communication device configured to send and receive text messages, said device comprising:
a body;
a display located on a front face of said body and upon which information is displayed during text entry;
a key field located on the front face of said body, said key field being composed of a plurality of alphanumeric input keys and menu control keys; and
a removable trackball navigation tool assembly comprising a ball supported by the trackball navigation tool assembly, said trackball navigation tool assembly being one of releasably snap-engaged and releasably friction-engaged in said body thereby enabling independent removal of the trackball navigation tool assembly from the device.

2. The handheld wireless communication device as recited in claim 1, wherein said trackball navigation tool assembly is releasably snap-engaged in said body.

3. The handheld wireless communication device as recited in claim 1, wherein said ball is freely rotatable and said trackball navigation tool assembly comprises a sensor assembly that detects rotation of the ball.

4. The handheld wireless communication device as recited in claim 3, wherein the ball is retained in a fixed position relative to the sensor assembly by a ball retaining clip.

5. The handheld wireless communication device as recited in claim 4, wherein said ball retaining clip comprises a ball retaining ring and a plurality of fixing feet extending from said ball retaining ring.

6. The handheld wireless communication device as recited in claim 5, wherein each of said plurality of fixing feet extends in a direction parallel to a longitudinal axis of the trackball navigation tool.

7. The handheld wireless communication device as recited in claim 1, wherein said trackball navigation tool assembly is mounted within a cavity defined in the front face of the body.

8. The handheld wireless communication device as recited in claim 7, further comprising an assembly retaining clip releasably retaining the trackball navigation tool assembly in the cavity.

9. The handheld wireless communication device as recited in claim 8, wherein said assembly retaining clip comprises an assembly retaining ring and a plurality of snap-engaging feet extending from said assembly retaining ring.

10. The handheld wireless communication device as recited in claim 9, wherein each of said plurality of snap-engaging feet extends in a direction parallel to the longitudinal axis of the trackball navigation tool assembly.

11. The handheld wireless communication device as recited in claim 9, wherein each of said plurality of snap-engaging feet releasably engages a lateral port in said cavity.

12. The handheld wireless communication device as recited in claim 11, wherein each of said plurality of snap-engaging feet includes an inclined surface for snap-engagement with a complimentary inclined surface in a respective lateral port in said cavity.

13. The handheld wireless communication device as recited in claim 1, wherein said alphanumeric input keys comprise a plurality of alphabetic keys having letters associated therewith.

14. The handheld wireless communication device as recited in claim 13, wherein said letters associated with said alphanumeric keys are arranged in one of a QWERTY, reduced-QWERTY, or QWERTZ layout.

15. The handheld wireless communication device as recited in claim 1, wherein said alphanumeric input keys comprise numeric keys having numerals associated therewith and wherein said associated numerals are arranged in a telephone keypad layout.

16. The handheld wireless communication device as recited in claim 1, wherein said body is configured to be held in a hand of a user with a long axis of said device substantially horizontally oriented during text entry.

17. The handheld wireless communication device as recited in claim 1, wherein said body is configured to be held in a hand of a user with a long axis of said device substantially vertically oriented during text entry.

18. The handheld wireless communication device as recited in claim 1, wherein said display is located in an upper portion of the front face of said body during text entry, said key field is located in a lower portion of the front face of said body during text entry and said trackball is located substantially between said key field and said display.

19. The handheld wireless communication device as recited in claim 1, wherein said trackball navigation tool assembly is at least partially surrounded by said key field.

20. A trackball assembly for releasable engagement with a handheld wireless communication device having a body comprising:
   a trackball navigation tool assembly, said trackball navigation tool being one of releasably snap engaged and releasably friction-engaged in the body thereby enabling independent removal of the trackball navigation tool assembly from the device; and
   a freely rotatable ball supported by the trackball navigation tool assembly.

21. A method for assembling a trackball navigation tool on a handheld wireless communication device having a body comprising:
   mounting the trackball navigation tool assembly within a cavity defined in the front face of the body, said trackball navigation tool assembly comprising a ball supported by the trackball navigation tool assembly; and
   installing a trackball assembly retaining clip for releasably snap-engagement and releasably friction-engagement with the body thereby enabling independent removal of the trackball navigation tool assembly from the device.

* * * * *